United States Patent [19]

O'Banion et al.

[11] Patent Number: 5,297,463
[45] Date of Patent: Mar. 29, 1994

[54] ADJUSTABLE FENCE FOR COMPOUND MITER SAW

[75] Inventors: Michael L. O'Banion, Westminster; Daryl S. Meredith, Hampstead, both of Md.

[73] Assignee: Black & Decker Inc., Newark, Del.

[21] Appl. No.: 774,022

[22] Filed: Oct. 9, 1991

[51] Int. Cl.$^5$ .............................................. B27B 27/08
[52] U.S. Cl. ...................................... 83/468.3; 83/397; 83/471.3; 83/478; 83/490
[58] Field of Search ............... 83/468.3, 468.7, 471.3, 83/478, 490, 581, 391, 393, 397; 144/253 H, 287

[56] References Cited

U.S. PATENT DOCUMENTS

| | | | |
|---|---|---|---|
| D. 295,823 | 5/1988 | Brickner, Jr. et al. | D8/66 |
| 2,095,330 | 10/1937 | Hedgpeth | 83/478 X |
| 2,559,283 | 7/1951 | Dick, Jr. | 83/473 |
| 2,601,878 | 7/1952 | Anderson | 83/471.3 |
| 3,192,814 | 7/1965 | Zimmerman | 83/468.3 X |
| 3,302,669 | 2/1967 | Edler | 83/471.3 |
| 3,901,498 | 8/1975 | Novak | 83/471.3 X |
| 4,002,094 | 1/1977 | Erickson et al. | 83/471.3 |
| 4,152,961 | 5/1979 | Batson | 83/471.3 |
| 4,452,117 | 6/1984 | Brickner et al. | 83/471.3 X |
| 4,556,094 | 12/1985 | Willocks | 83/471.3 X |
| 4,561,336 | 12/1985 | Davis | 83/859 |
| 4,600,184 | 7/1986 | Ashworth | 269/303 |
| 4,638,700 | 1/1987 | Fushiya et al. | 83/471.3 X |
| 4,798,113 | 1/1989 | Viazanko | 83/468.3 X |
| 4,817,693 | 4/1989 | Schuler | 83/471.2 X |
| 4,934,233 | 6/1990 | Brundage et al. | 83/397 |
| 5,042,348 | 8/1991 | Brundage et al. | 83/471.3 |

FOREIGN PATENT DOCUMENTS

591212 8/1947 United Kingdom .

*Primary Examiner*—Frank T. Yost
*Assistant Examiner*—Clark F. Dexter
*Attorney, Agent, or Firm*—Charles E. Yocum; Dennis A. Dearing; John D. Del Ponti

[57] ABSTRACT

An improved adjustable workpiece-supporting fence assembly for a compound miter saw, or other work-performing device, includes a fixed fence portion fixedly interconnected with the base of the device, with the fixed fence portion being disposed on one side of the saw blade, the workpiece cutter, or other such device for performing a working operation on a workpiece. A movable fence portion is selectively and laterally movably interconnected with the base on the opposite side of the work-performing blade or cutter and is laterally spaced from the fixed fence portion. The base or other portion of the device includes a fence-supporting portion fixedly disposed on the same opposite side of the blade or cutter, and both fixed and movable clamping arrangements are provided for releasably clamping the movable fence portion at any of a number of adjusted lateral positions therein, with the movable clamping arrangement being movable with the movable fence. In addition, a raised portion of the movable fence is preferably configured to interferingly engage with a guard on the blade, cutter, or other such movable work performing device, thus minimizing the possibility of damaging the movable fence in order to alert the operator that the movable fence has not been properly adjusted for the workpiece cutting or forming operation being attempted.

47 Claims, 5 Drawing Sheets

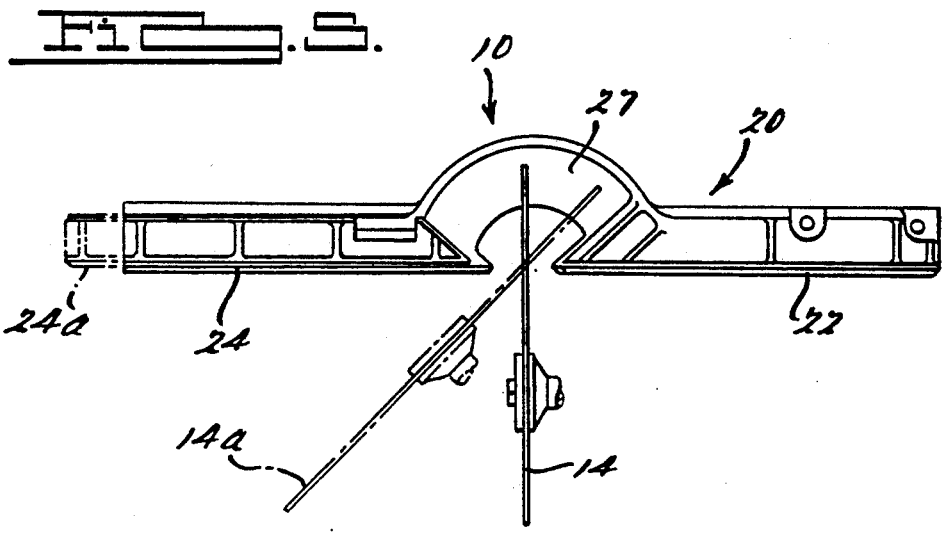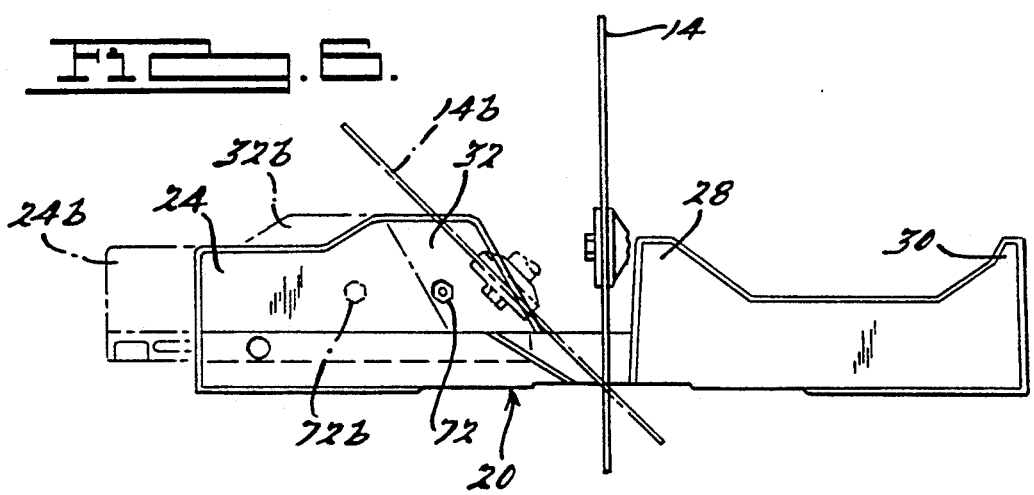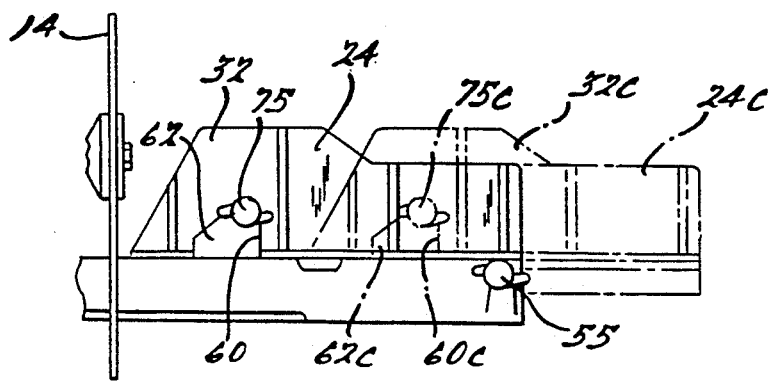

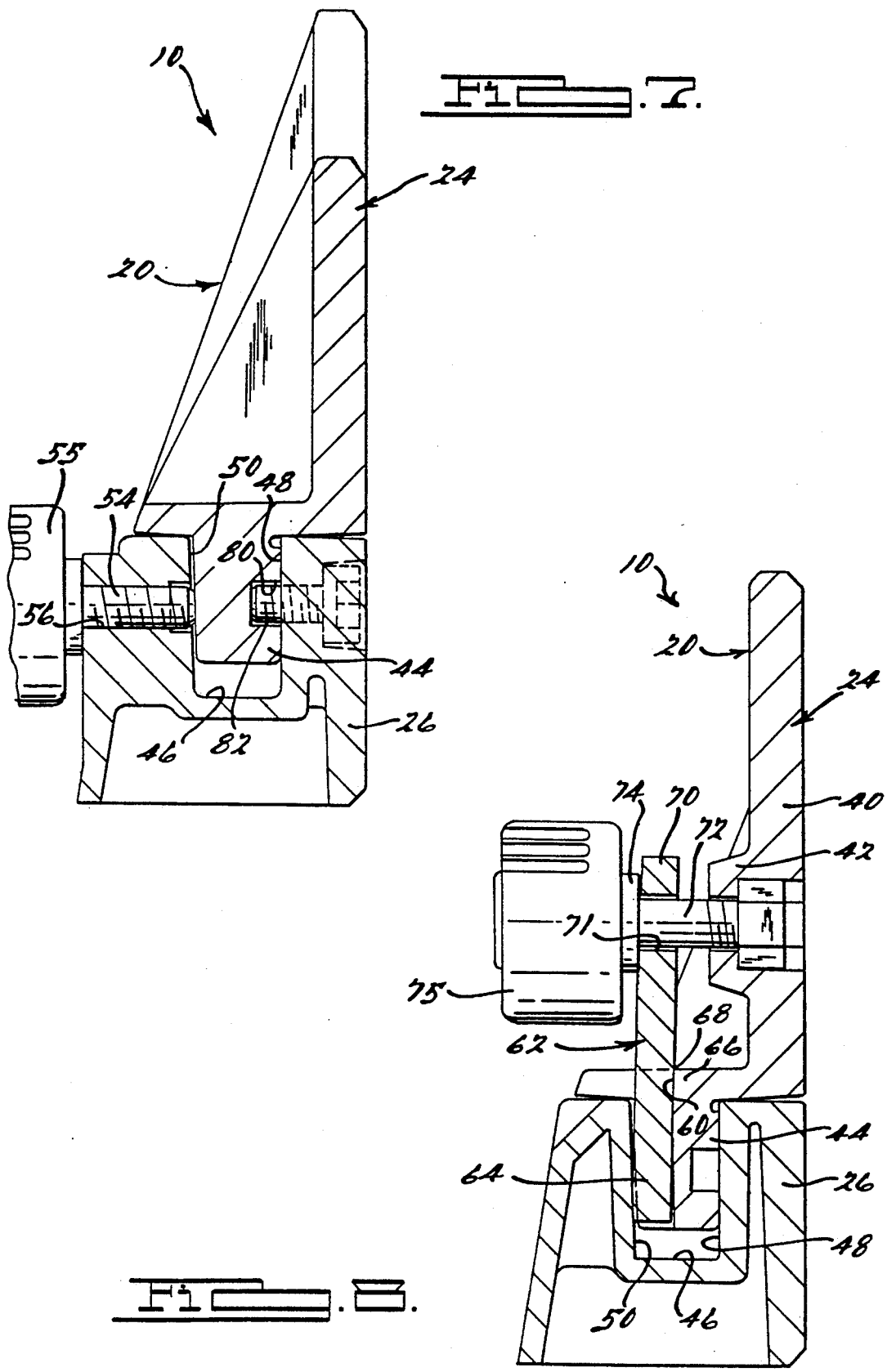

ADJUSTABLE FENCE FOR COMPOUND MITER SAW

BACKGROUND AND SUMMARY OF THE INVENTION

The present invention relates generally to compound miter saws, or other power operated equipment or machinery. More particularly, the invention relates to improvements in an adjustable fence for such power-operated equipment, with the fence assembly having a fixed fence portion and a movable fence portion for selectively adjusting the gap between the fixed and movable fence portions in order to allow sufficient clearance for performing various operations on a workpiece when the equipment is in any of a number of different cutting or working modes.

Saws and other apparatuses designed for cutting or performing other working operations on a workpiece typically require a workpiece-supporting fence assembly in order to support and locate the workpiece in a proper fixed position for performing the working operation. Examples of such equipment include compound miter saws, which are adapted for allowing the user to selectively move the saw blade into any of a number or positions or modes for square cutting, miter cutting, bevel cutting, or compound cutting where a combination miter and bevel are cut. In addition, some operations, such as dado cutting or shaping operations, for example, require the use of saw blades or other cutting or working devices of different shapes or sizes to be substituted for one another in order to perform the desired operation on the workpiece, whether the workpiece is composed of wood, plastic, metal, or other materials.

In order to accommodate these widely varied working operations, the workpiece-supporting fence is frequently required to be at least partially adjustable in order to selectively vary the gap or space between a fixed and a movable portion of the workpiece-supporting fence, thus selectively providing clearance for the saw blade, cutter, or other device performing the working operation on the workpiece. If such adjustability were not provided, a relatively large permanent gap would have to be provided between portions of the fence in order to accommodate the widely varying range of movement, position, or size of the saw blade, cutter, or other working device. Thus, in order to provide adequate workpiece support when performing operations that do not require such large clearance, the above mentioned adjustable fence assemblies, having at least one movable fence portion, have frequently been provided.

In order to address the above-discussed problems associated with the provision of a fence assembly having an adjustable clearance gap, a variety of fence-adjusting arrangements have previously been provided. However, many of such prior fence-adjusting arrangements have suffered various disadvantages, including difficulty in maintaining proper alignment between the relatively movable fence portions in wide-gap positions, inconvenience in performing fence adjustment operations, the possibility of inadvertently misplacing a removable fence portion, lack of adequate support for relatively tall or thick workpieces, or other similar disadvantages. Thus, the need has arisen for an adjustable fence for compound miter saws, or other power equipment requiring fence adjustability, which overcomes these disadvantages, as well as providing improved ease of operation, economy in manufacturing, and other advantages that will become readily apparent to those skilled in the art from the discussion below.

In accordance with the present invention, an improved adjustable workpiece-supporting fence assembly includes a fixed fence portion fixedly interconnected with the base of the device in which it is employed, with the fixed fence portion being disposed on one side of the saw blade, the workpiece cutter, or other such device for performing a working operation on a workpiece. A movable fence portion is selectively and laterally movably interconnected with the frame on the opposite side of the work-performing blade or cutter and is laterally spaced from the fixed fence portion. The base or other portion of the device in one preferred form of the invention includes a fence-supporting portion fixedly disposed on the same opposite side of the blade or cutter, with a laterally-extending slot formed therein. The slot, which preferably has spaced opposite internal walls therein, is adapted to receive a laterally-extending tongue portion of the movable fence, with the tongue being slidably received within the slot for selective adjustable lateral movement of the movable fence toward and away from the fixed fence.

In such preferred embodiments of the present invention, a fixed clamping arrangement is interconnected with the fixed fence-supporting portion for releasably and clampingly urging the tongue on the movable fence portion against a first of the slot's internal walls at any of a number of adjusted positions therein. In addition, a movable clamping arrangement is fixedly interconnected with the movable fence portion for movement therewith and is adapted for releasably and clampingly urging the tongue portion against the same first internal wall of the slot at any of a number of the adjusted positions. Preferably, the fixed and movable clamping mechanisms are located to provide the greatest possible lateral spacing therebetween, and thus the maximum alignment and stability, when the movable fence portion is adjusted to a position wherein the lateral spacing or gap between the fixed and movable fence portions is at its minimum.

In order to accomplish the above arrangement, the preferred movable clamping mechanism includes a clamping plate pivotally interconnected with the movable fence portion and having an abutment portion pivotally movable into and out of clamping engagement with the second, opposite internal wall portion of the slot. Such pivotal movement of the clamping plate abutment portion into clamping engagement with the opposite internal wall portion of the slot causes a reactive force that clampingly urges the tongue portion of the movable fence against the first internal wall portion of the slot. This arrangement adjustably secures the movable fence portion at any of a number of selectively adjustable lateral positions relative to the fixed fence portion, regardless of the size of the fence clearance gap.

In addition, the preferred embodiments of the present invention also include a raised portion of the movable fence, with such raised portion being configured to interferingly engage with the saw blade assembly and guard, or other such movable work performing device, without inadvertently damaging the movable fence in order to alert the operator that the movable fence has not been properly adjusted for the workpiece cutting or forming operation being attempted. Such raised portion of the movable fence, as well as a similar raised portion of the fixed fence portion, provides a significant advantage when cutting or working thicker or taller workpieces.

Additional objects, advantages, and features of the present invention will become apparent from the following description and the appended claims, taken in conjunction with the accompanying drawings.

BRIEF DESCRIPTION OF THE DRAWINGS

FIG. 5 is a schematic plan view diagram of the compound miter saw of FIGS. 1 through 4, schematically illustrating the position of the saw blade relative to the workpiece-supporting fence in both a straight cross-cut position and in a miter-cutting position.

FIG. 6 is a schematic diagram, similar to that of FIG. 5, but shown in an elevational view and illustrating the position of the saw blade relative to the workpiece supporting fence when in both a straight cross-cut position and in a bevel-cutting position.

FIG. 6A is a schematic diagram, looking from the rear of the saw, depicting the fully extended and fully retracted positions of a movable portion of the work-supporting fence.

FIG. 7 is a partial cross-sectional view of the work-supporting fence of the exemplary compound miter saw illustrated in FIGS. 1 through 4, taken generally along line 7—7 of FIG. 2.

FIG. 8 is a cross-sectional view similar to that of FIG. 7, but taken generally along line 8—8 of FIG. 2.

DETAILED DESCRIPTION OF THE PREFERRED EMBODIMENTS

Figures 1, 2:
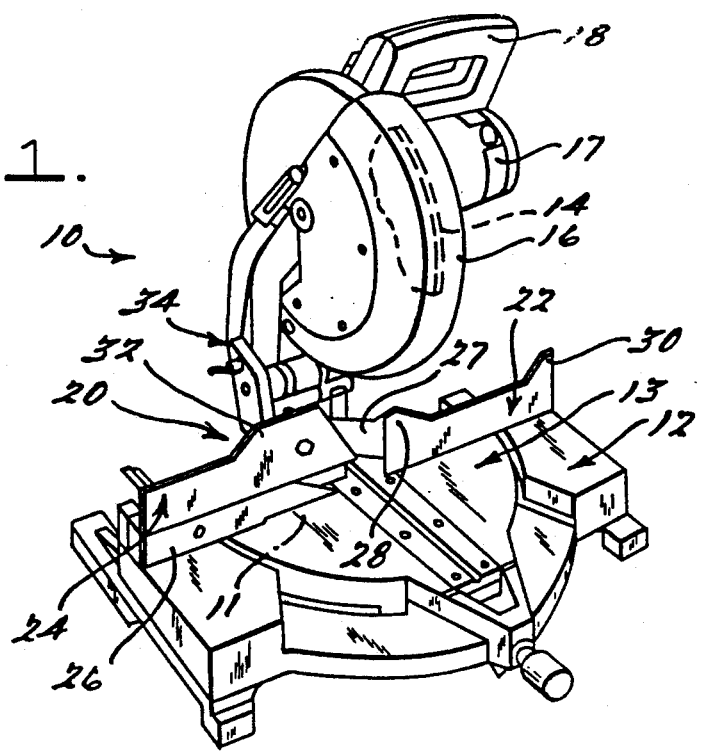
FIG. 1 is a front perspective view of an exemplary compound miter saw according to the present invention.
FIG. 2 is a front elevational view of the compound miter saw of FIG. 1.

FIGS. 1 through 10 illustrates an exemplary compound miter saw having an adjustable fence assembly according to the present invention, shown merely for purposes of illustration. One skilled in the art will readily recognize from the following description, taken in conjunction with the accompanying drawings and claims, that the principles of the invention are equally applicable to compound miter saws or saws of types other than that shown for purposes of illustration in the drawings. Similarly, one skilled in the art will readily recognize that the principles of an adjustable fence according to the invention are also applicable to other types of powered, or even unpowered, equipment for performing an operation on a workpiece. Such equipment includes non-compound miter saws, dado saws, spindle shapers or sanders, or other types of powered or unpowered devices that require selective adjustment of the gap or spacing in the fence assembly in order to accommodate different sizes or positions of tooling, or to perform various different workpiece working operations.

Referring primarily to FIGS. 1 through 4, an exemplary compound miter saw 10 according to the present invention typically includes a base assembly 12, including a table assembly 13, which is preferably rotatable in order to accommodate the various cutting modes discussed below. The saw 10 also includes a saw blade 14, at least partially enclosed by a blade guard 16 and driven by a motor 17, and a handle 18, which allows the operator to move the saw blade 14 and the blade guard 16 from a clear position free of a workpiece 11 to a cutting position with the saw blade 14 in cutting engagement with the workpiece 11.

As is conventional in this type of equipment, a fence assembly, indicated generally by reference numeral 20, is interconnected with the base 12 and extends laterally across the table assembly 13, against which the workpiece 11 is fixedly positioned and supported for performing a cutting operation thereon. According to the present invention, the fence assembly 20 includes a fixed fence portion 22 and a movable fence portion 24, with the fixed and movable fence portions 22 and 24, respectively, extending in a mutually aligned lateral direction, with the movable fence portion 24 being laterally spaced away from the fixed fence portion 22. Such lateral spacing or gap between the fixed and movable fence portions 22 and 24, respectively, provides clearance for the saw blade to perform a cutting operation completely through the workpiece 11, regardless of the mode or type of cutting operating being performed. As is discussed in more detail below, the movable fence portion 24 is laterally movable toward and away from the fixed fence portion 22 in order to allow the operator to selectively adjust the clearance gap therebetween and thus accommodate the particular cutting operation being performed.

As is schematically illustrated in FIGS. 5 and 6, the exemplary compound miter saw 10 depicted in the drawings is capable of a number of different cutting modes or positions. In FIG. 5, a schematic plan view generally illustrates the position of the saw blade 14 relative to the frame 12 and the fence assembly 20 when performing straight cross-cut or so-called straight miter-cutting operations. Such straight, square, cross-cut cutting operation is schematically illustrated by the position of the components of the compound miter saw 10 shown in solid lines in FIG. 5, with the movable fence portion 24 having been selectively adjusted to provide the minimum required clearance gap between the fixed and movable fence portions 22 and 24, respectively, with the saw blade being moved into the cutting position along a single, vertical plane, substantially perpendicular to both the front face of the fence assembly 20 and the upper face of the table 13. In contrast, an exemplary miter-cutting operation is also schematically illustrated in phantom lines in FIG. 5, in which the plane of movement of the saw blade 14 remains perpendicular to the table 13, but is swung to a preselected miter angle relative to the fence assembly 20, as indicated by reference numeral 14a, and in which the movable fence portion 24 has been preselectively adjusted, as indicated by reference numeral 24a, to increase the clearance gap between the fixed and movable fence portions 22 and 24a, respectively, in order to provide sufficient clearance for the saw blade 14a and associated components in a miter-cutting operation.

Similarly, FIG. 6 illustrates the saw blade 14 and the movable fence portion 24 in a schematic elevational view, showing the position of the saw blade 14 and the movable fence portion 24 in solid lines for performing the above-described straight, square, cross-cutting operation, with the relative positions of the saw blade 14 and the movable fence portion 24 being shown in phantom lines, as indicated by reference numerals 14b and 24b, respectively, for performing a different type of mitering operation wherein a bevel cut is performed on the workpiece, with the plane of movement of the saw blade 14b being generally perpendicular to the face of the fence assembly 20, but oriented at a bevel or miter angle with respect to the table assembly 13.

Although not specifically illustrated in the drawings, one skilled in the art will readily recognize, from the exemplary positions diagrammatically illustrated in FIGS. 5 and 6, that the miter-cutting operation can be combined with the bevel-cutting operation in order to perform an operation commonly known as a compound cut, wherein the saw blade moves in a plane that is not perpendicular to either the front face of the fence assembly 20 or the upper face table assembly 13, thus performing a beveled and mitered, or "compound mitered", cut through the workpiece.

Thus, the compound miter saw 10 shown for purposes of illustration in the drawings is capable of at least four general types of cutting operations, to which reference is made herein as cross-cutting, miter-cutting, bevel-cutting, and compound cutting operations. Such typically infinite compound adjustability of the relative position and orientation of the saw blade relative to both the table assembly 13 and the fence assembly 20 is accomplished by way of a compound pivot mechanism 34, illustrated generally in FIGS. 3 and 4. Such compound pivot mechanism 34 can be any of a number of well-known compound mechanisms, which also allow the saw blade 14 and the blade guard 16 to be pivotally moved from a raised, clear position to a lowered or cutting position, once the saw is adjusted to the desired operating mode, in order to perform a cutting operation on the workpiece 11.

Figure 3:
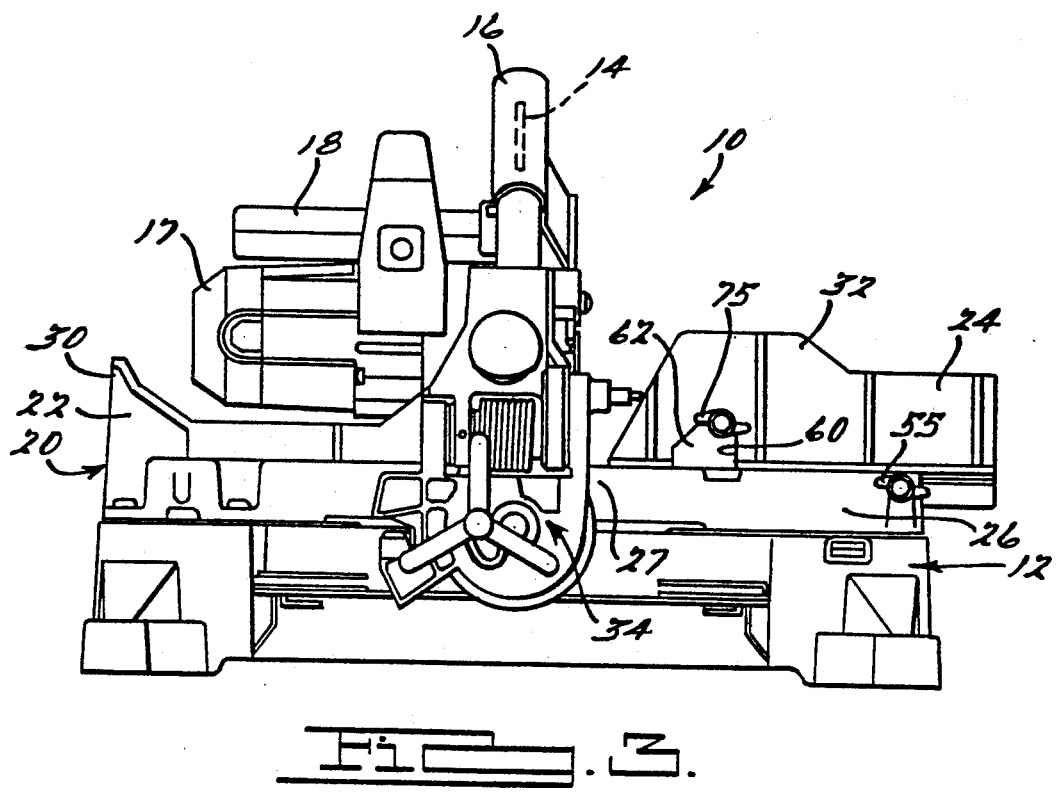
FIG. 3 is a rear elevational view of the compound miter saw of FIGS. 1 and 2.
Figure 4:
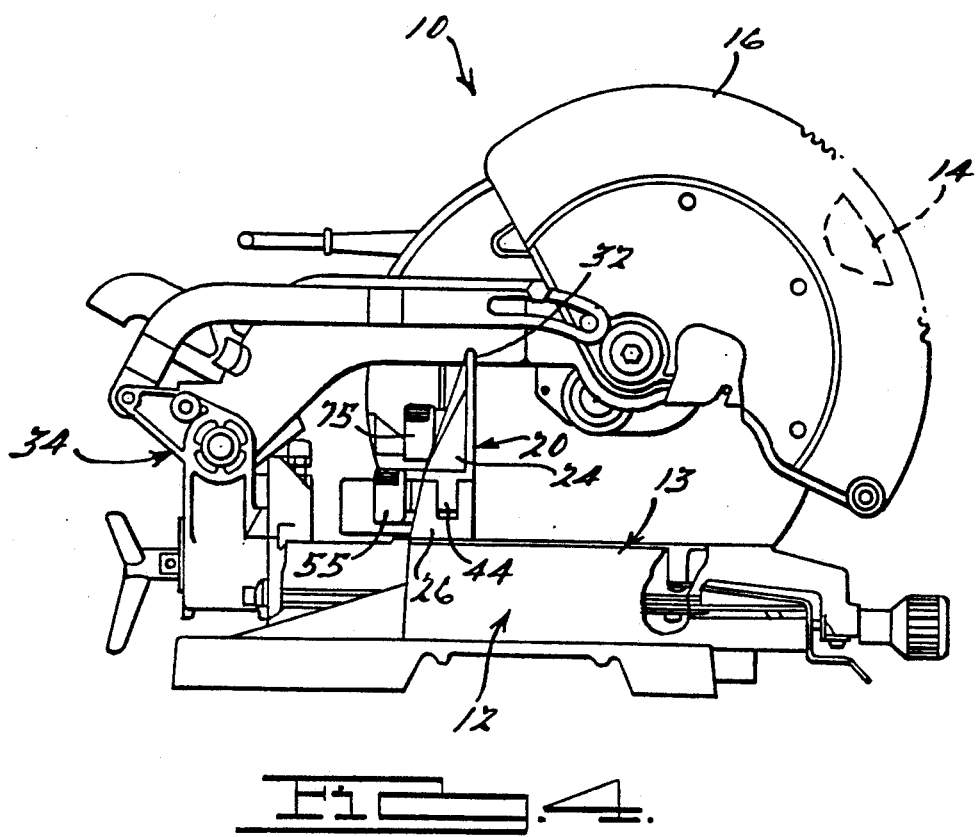
FIG. 4 is a left end elevational view of the compound miter saw of FIGS. 1 through 3.

In order to accommodate the widely divergent positions and orientations of the saw blade 14 relative to the fence assembly 20, and in order to allow a complete cut-through operation to be performed on the workpiece 11, the fence assembly 20 must be capable of selective adjustment in order to preadjust the lateral clearance gap or spacing between the fixed and movable fence portions 22 and 24, respectively, in order to provide the required clearance, while still providing adequate support for the workpiece 11. In accordance with a preferred form of the present invention, such fence assembly adjustability is accomplished in part by the provision of a fence-supporting portion 26 of the base 12. The fence-supporting portion 26 can be a separate component, fixedly secured to the base 12, or it can be an integral portion of the fixed fence 22, with an interconnecting portion 27 extending laterally across the clearance gap, behind the fixed and movable fences to the opposite side of the saw blade to interconnect with the fixed fence 22, as shown in FIGS. 1, 3 and 5, without interfering with the complete cutting of the workpiece 11. In either arrangement, the fence-supporting portion 26 is fixedly secured to, or interconnected with, the base 12 and is mutually aligned in a laterally-extending direction with the fixed fence portion 22.

As perhaps best seen in FIGS. 7 and 8, the fence-supporting portion 26 preferably includes a slot 46 defined by a first or front internal wall 48 spaced away from a second or rear internal wall 50, in order to form a space therebetween extending laterally along the movable fence side of the saw blade 14. The movable fence 24 preferably includes an upper portion 40, an intermediate portion 42, a tongue portion 44 slidably received within the slot 46, and a lower face of the intermediate portion 42 slidably engaging the fence-supporting portion 26. The front faces of the fence-supporting portion 26 and the movable fence portion 24 are vertically aligned and flush with one another, as is illustrated in FIGS. 7 and 8.

In order to secure the movable fence portion 24 in a preselected, adjusted position for purposes of performing a desired cutting operation, two clamping arrangements are preferably provided for releasably fixing the position of the movable fence portion 24 relative to the fence-supporting portion 26, with their front faces flush and vertically aligned. The fixed clamping mechanism preferably includes a clamping screw 54 threadably engaging and movable within a threaded opening 56 in the fixed fence-supporting portion 26. The clamping screw is selectively rotatable by way of a manual knob 55 in order to threadably advance the clamping screw 54 toward the tongue 44 and to clampingly and forcibly urge the tongue 44 against the front internal wall 48 of the slot 46, as shown in FIG. 7.

A movable clamping mechanism is also preferably provided, as is illustrated in FIG. 8, and a recessed portion 60 of the movable fence 24 is provided to accommodate a clamping plate 62 disposed on the rear side of the movable fence 24. The clamping plate 62 preferably includes an abutment portion 64, extending into the slot 46, which is selectively pivotally movable into abutment with the rear internal wall 50 of the slot 46, by way of the pivotal engagement of the clamping plate 62 about a fulcrum edge 68 of a shoulder portion 66 formed on the fence-supporting portion 26. The abutment portion 64 of the clamping plate 62 is held in its abutting relationship with the rear internal wall 50 of the slot 46 preferably by way of a threaded rod member 72 fixed on the movable fence portion 24, and extending through an opening 71 in the clamping plate 62 to threadably engage a locking nut 74, preferably having a knob 75 on the locking nut 74.

Thus, by threadably tightening the locking nut 74, the operator forcibly urges the locking portion 70 of the clamping plate 62 toward the movable fence portion 24, which results in the abutment portion 64 of the clamping plate 62 being pivoted rearwardly about the fulcrum edge 68 in order to abuttingly and forcibly engage the rear internal wall 50 of the slot 46. As a result of this forcible abutting engagement of the abutment portion 64 against the rear internal wall 50 of the slot 46, a reactive force is exerted on the movable fence portion 24 in a frontward direction to forcibly and clampingly urge the tongue 44 against the forward internal wall 48 of the slot 46, thus releasably and securely clamping the movable fence 24 in its preselected lateral position relative to the fixed fence 22.

This arrangement allows for example, the lateral distance between the above-discussed fixed and movable clamping arrangements to be at its maximum when the movable fence 24 is adjusted to provide the minimum clearance gap, such as would be desired in straight cross-cutting operations, such as that shown in FIG. 1. This gives the greatest amount of uniform clamping distribution for releasably securing the movable fence 24 in this position, which in turn provides the maximum amount of support for the workpiece 11. However, the fence assembly of the present invention allows both the clamping arrangements to be used even when the movable fence 24 must be positioned laterally farther away from the fixed fence portion 22 in order to accommodate other cutting modes. This is because the above-described clamping plate arrangement is interconnected and movable with the movable fence 24. It can readily be seen that if both clamping arrangements had been fixed relative to the fence-supporting portion 26, many outwardly-adjusted positions of the movable fence 24 would result in only one of the clamping arrangements being usable to secure the movable fence 24 in its adjusted position, thus increasing the possibility of misalignment either vertically or laterally with the fixed fence 22 and lessening the work-supporting capabilities of the fence assembly 20. The fully retracted position of the movable fence 24 is shown in solid lines in FIG. 6, with the fully extended position (indicated by reference numeral 24c) is shown in phantom lines.

Figure 9:
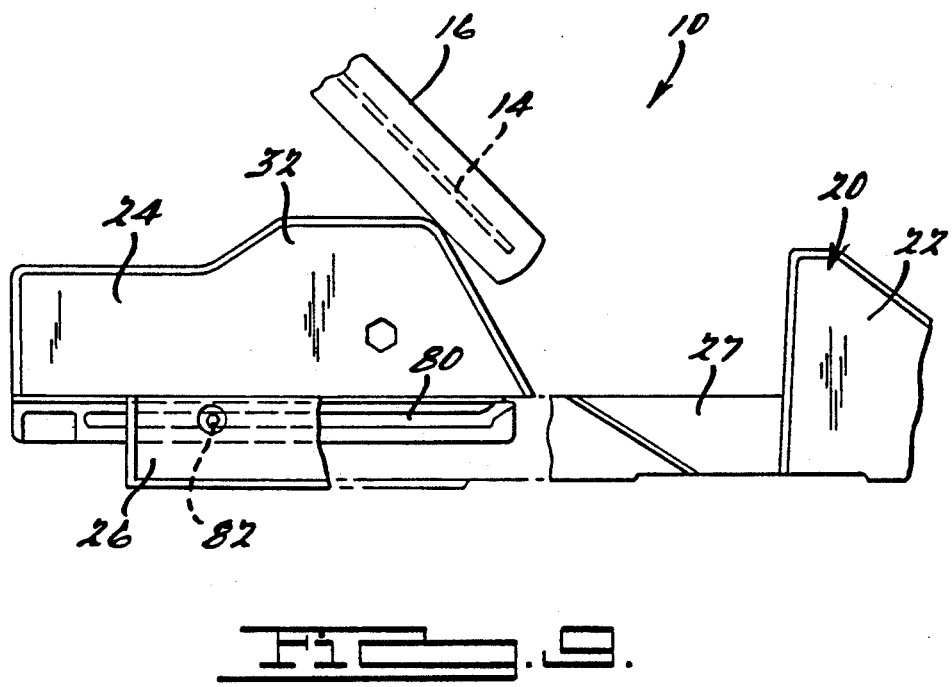
FIG. 9 is a schematic illustration of the preferred interfering relationship of the saw blade guard with the movable portion of the work-supporting fence assembly for alerting the operator that the movable portion of the fence assembly has not been properly adjusted for the operation being performed.

In order to minimize the possibility of inadvertent removal of the movable fence 24 from the table 13 and the frame 12 during position adjustments, the front face of the tongue 44 is preferably provided with an elongated antiremoval groove or slot 80 extending laterally therealong, as shown in FIGS. 7 and 9. A complementary projection 82 is fixed to the fence-supporting portion 26 and protrudes into the slot 46 to be received in the antiremoval groove 80. As perhaps best seen in FIG. 9, the lateral length of the groove 80 is sufficient to allow full adjusting movement of the movable fence 24 but insufficient to allow inadvertent removal of the movable fence 24. In addition, the clamping plate 62 also interferes with removal of the movable fence 24 unless the clamping plate 62 is first loosened.

When it is desired to intentionally remove the movable fence 24 for repair, replacement or cleaning, however, the fixed clamping screw 54 (see FIG. 7) can be sufficiently loosened, and the clamping plate 62 (see FIG. 8) is loosened, allowing the movable fence 24 to be removed.

Since the movable fence 24 must be movably adjusted, in order to allow the operator to perform various cutting operations of the compound miter saw 10, damage to the movable fence 24 could result if the operator fails to properly adjust its lateral position. In order to minimize such damage, which could result from the saw blade 14 contacting a misadjusted movable fence 24, a raised portion 32 is formed generally at the saw blade end of the movable fence 24, with the edge of such raised portion 32 sloping generally downwardly toward the saw blade 14 and the table assembly 13. Such raised portion 32 is sized and configured, as is schematically illustrated in FIG. 9, so that it interferingly engages the blade guard 16 if the blade guard 16 and the saw blade 14 are moved from their clear position to their cutting position when in substantially all of the cutting set-up modes or configurations of which the compound miter saw 10 is capable.

In addition, as can be seen in FIGS. 1 through 3, the raised portion 32 of the movable fence 24, along with one or more raised portions 28 and 30 on the fixed fence 22, provide an increased vertical workpiece-supporting face or surface, which allows the operator to properly support a relatively tall or thick workpiece. Such increased-height workpiece-supporting capability is especially advantageous when cutting thick stock, crown moldings, or other such relatively tall workpiece shapes, orientations, or configurations.

Figure 10:
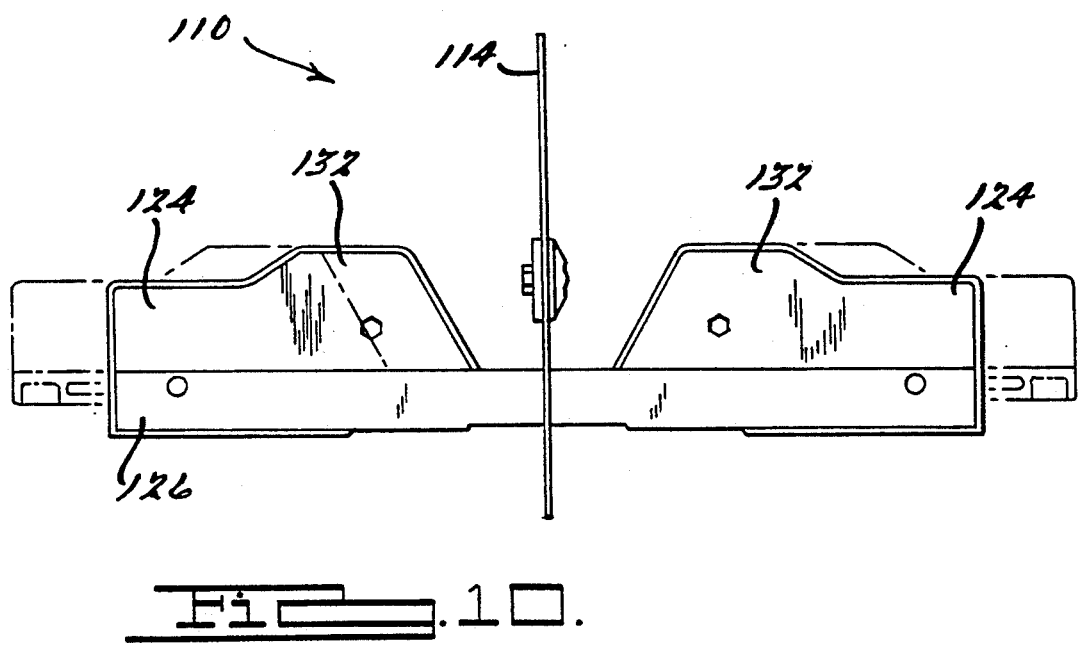
FIG. 10 is a schematic representation illustrating the provision of a movable portion of the fence assembly on each lateral side of an exemplary compound miter saw.

FIG. 10 schematically illustrates the provision of a laterally adjustable movable fence portion on each lateral side of an exemplary compound miter saw according to the invention. Such dual movable fence provision accommodates movement to selective miter, bevel, and compound cutting operations on either lateral side of the compound miter saw. Similarly such an arrangement is advantageous in other work-performing devices where work operations can be performed on either lateral side of the device, as well as being capable of accommodating large working tools, such as large shaper cutters, for example.

In such alternate arrangement, as schematically illustrated in FIG. 10, each lateral side of an exemplary compound miter saw 110 includes a fence-supporting portion 126 for slidably supporting a movable fence portion 124, with these components, as well as their respective fixed and movable clamping arrangements, being essentially the same in configuration and function as those discussed above, but preferably arranged symmetrically, in a mirror-image configuration on opposite sides of the saw blade 114.

Accordingly, the exemplary compound miter saw 10 constructed in accordance with the principles of the present invention provides for increased ease of fence clearance gap adjustability, it facilitates proper fence alignment and securement, both vertically and laterally, when performing any of the widely divergent cutting operations for which the compound miter saw 10 is designed, it provides increased protection against inadvertent fence damage due to a nonadjusted or misadjusted fence, and it provides greatly improved workpiece-supporting capabilities for relatively thick or tall workpieces.

The foregoing discussion discloses and describes merely exemplary embodiments of the present invention for purposes of illustration only. One skilled in the art will readily recognize from such discussion, and from the accompanying drawings and claims, that various changes, modifications, and variations may be made therein without departing from the spirit and scope of the invention as defined in the following claims.

What is claimed is:

1. A compound miter saw having a base and a saw blade selectively movable to any of a number of selected cutting positions, including miter, bevel, and compound cutting positions, comprising: an adjustable, laterally-extending, workpiece-supporting fence assembly, said fence assembly including a fixed fence portion fixedly interconnected with the base and disposed on one side of the saw blade, and a movable fence portion selectively laterally movable and interconnected with the base and disposed on an opposite side of the saw blade laterally spaced from said fixed fence portion, said fence assembly further including a fixed clamping means for selectively and clampingly securing said movable fence portion in cooperation with any of said number of selected cutting positions relative to the saw blade and the base, said fixed clamping means being fixedly interconnected with the base, and a movable clamping means fixedly interconnected with said movable fence portion for selective movement therewith relative to the base for selectively and clampingly securing said movable fence portion in cooperation with any of said number of selected cutting positions, said fence assembly thereby being selectively adjustable to vary the lateral spacing between said fixed and movable fence portions in order to provide clearance for the saw blade at any of said number of selected cutting positions.

2. A compound miter saw according to claim 1, wherein said fixed clamping means includes a clamping screw threadably engaging a portion of the base at a fixed location thereon, said clamping screw being selectively threadably movable into and out of abutting engagement with said movable fence portion in order to respectively secure and release said movable fence portion at selectively adjustable lateral positions relative to said fixed fence portion.

3. A compound miter saw according to claim 1, wherein each of said fixed and movable fence portions has a raised portion protruding therefrom in a direction away from the base in order to engage and support a relatively large workpiece.

4. A compound miter saw according to claim 1, wherein the saw blade includes a removable blade guard interconnected therewith, the saw blade and said guard being movable between a cutting position engageable with the workpiece and a clear position away from the workpiece when the workpiece is held against said fence assembly, said movable fence portion having a raised portion protruding therefrom in a direction away from said frame, said raised portion being interferingly engageable with said guard if the saw blade and said guard are moved toward said cutting position without said movable fence portion first being adjustably moved to a position relative to said fixed fence portion so as to allow sufficient clearance between the fixed and movable fence positions for cutting the workpiece when the saw blade is in any of a number of said miter, bevel, and compound cutting positions, thereby minimizing the possibility of cutting the movable fence portion.

5. A compound miter saw according to claim 1, further including antiremoval means for minimizing the possibility of inadvertent removal of said movable fence portion from said compound miter saw during said lateral adjustable movement thereof, and removal means for overriding said antiremoval means in order to allow intentional removal of said movable fence portion.

6. A compound miter saw according to claim 5, wherein said antiremoval means includes an elongated groove formed in said movable fence portion, and a projection with the base and protruding into said groove, the lateral length of said groove being insufficient to allow removal of said movable fence portion even when in a fully outward adjustable lateral position at the maximum distance from said fixed fence portion.

7. A compound miter saw according to claim 6, wherein said movable clamping means is configured for further minimizing the possibility of inadvertent removal of said movable fence portion unless said movable clamping means is first loosened.

8. A compound miter saw having a base and a saw blade selectively movable to any of a number of selected cutting positions, including miter, bevel, and compound cutting positions, comprising: an adjustable, laterally-extending, workpiece-supporting fence assembly, said fence assembly including a fixed fence portion fixedly interconnected with the base and disposed on one side of the saw blade, and a movable fence portion selectively laterally movable and interconnected with the base and disposed on an opposite side of the saw blade laterally spaced from said fixed fence portion, said fence assembly further including a fixed clamping means fixedly interconnected with said base for selectively and clampingly securing said movable fence portion in cooperation with any of said number of selected cutting positions relative to the saw blade and the base, and a movable clamping means fixedly interconnected with said movable fence portion for selective movement therewith for selectively and clampingly securing said movable fence portion in cooperation with any of said number of selected cutting positions, said fence assembly thereby being selectively adjustable to vary the lateral spacing between said fixed and movable fence portions in order to provide clearance for the saw blade at any of said number of selected cutting positions, said movable clamping means including a clamping plate pivotally interconnected with said movable fence portion, said clamping plate having an abutment portion selectively movable into and out of clamping engagement with the base in order to respectively secure and release said movable fence at selectively adjustable lateral positions relative to said fixed fence portion.

9. A compound miter saw according to claim 8, wherein said movable fence portion includes a shoulder portion having a fulcrum edge formed thereon, said clamping plate being pivotally movable about said fulcrum edge.

10. A compound miter saw according to claim 9, wherein said movable clamping means includes selectively actuable means for releasably and forcibly urging a locking portion of said clamping plate toward said movable fence portion, said clamping plate pivotally engaging said fulcrum edge at a location between said abutment portion and said locking portion in order to pivot said abutment portion into said engagement with the base when said locking portion is forcibly urged toward said movable fence portion.

11. A compound miter saw according to claim 10, wherein said selectively actuable means includes a threaded rod fixedly interconnected with said movable fence portion on one side of said clamping plate and extending through an opening in said clamping plate locking portion, and a threaded nut threadably engaging said threaded rod on an opposite side of said clamping plate for selectively and threadably urging said locking portion of said clamping plate toward said movable fence portion in order to cause said abutment portion to be pivotally urged into said clamping engagement with the base.

12. A compound miter saw having a base and a saw blade selectively movable to any of a number of selected cutting positions, including miter, bevel, and compound cutting positions, comprising: an adjustable, laterally-extending, workpiece-supporting fence assembly, said fence assembly including a fixed fence portion fixedly interconnected with the base and disposed on one side of the saw blade, and a movable fence portion selectively laterally movable and interconnected with the base and disposed on an opposite side of the saw blade laterally spaced from said fixed fence portion, said fence assembly further including a fixed clamping means fixedly interconnected with said base for selectively and clampingly securing said movable fence portion in cooperation with any of said number of selected cutting positions relative to the saw blade and the base, and a movable clamping means fixedly interconnected with said movable fence portion for selective movement therewith for selectively and clampingly securing said movable fence portion in cooperation with any of said number of selected cutting positions, said fence assembly thereby being selectively adjustable to vary the lateral spacing between said fixed and movable fence portions in order to provide clearance for the saw blade at any of said number of selected cutting positions, the base including a fence-supporting portion fixedly disposed on said opposite side of the saw blade with a laterally-extending slot formed therein, said slot having opposite internal walls therein, said movable fence portion having a laterally-extending tongue portion slidably received within said slot for selective lateral movement therein toward and away from said fixed fence portion, said fixed clamping means being interconnected with said fence-supporting base portion for selectively and clampingly urging said tongue portion against a first internal wall of said slot corresponding to any of a number of selected positions of said movable fence portion relative to the base, said movable clamping means being adapted for selectively and clampingly urging said tongue portion against a second portion of said first internal wall corresponding to said number of selected positions of said movable fence portion relative to the base.

13. A compound miter saw according to claim 12, wherein said movable clamping means includes a clamping plate pivotally interconnected with said movable fence portion and having an abutment portion selectively pivotally movable into and out of clamping engagement with an opposite internal wall portion of said slot, said selective pivotal movement of said clamping plate abutment portion into clamping engagement with said opposite internal wall portion of said slot causing a reactive force clampingly urging said tongue portion against said first internal wall portion of said slot in order to adjustably secure said movable fence portion at selectively adjustable lateral positions relative to said fixed fence portion, and said selective pivotal movement of said clamping plate abutment portion out of clamping engagement with said opposite internal wall portion of said slot allowing said movable fence portion to be selectively and adjustably moved laterally toward and away from said fixed fence portion.

14. A compound miter saw according to claim 13, wherein said movable fence portion includes a shoulder portion having a fulcrum edge formed thereon, said clamping plate being pivotally movable about said fulcrum edge.

15. A compound miter saw according to claim 14, wherein said movable clamping means includes selectively actuable means for releasably and forcibly urging a locking portion of said clamping plate toward said movable fence portion, said clamping plate pivotally engaging said fulcrum edge at a location between said abutment portion and said locking portion in order to pivot said abutment portion into said engagement with said opposite internal wall portion of said slot when said locking portion is forcibly urged toward said movable fence portion.

16. A compound miter saw according to claim 15, wherein said selectively actuable means includes a threaded rod fixedly interconnected with said movable fence portion on one side of said clamping plate and extending through an opening in said clamping plate locking portion, and a threaded nut threadably engaging said threaded rod on an opposite side of said clamping plate for selectively and threadably urging said locking portion of said clamping plate toward said movable fence portion in order to cause said abutment portion to be pivotally urged into said clamping engagement with said opposite internal wall portion of said slot.

17. A compound miter saw according to claim 12, wherein said fixed clamping means includes a clamping screw threadably engaging a portion of said fence-supporting base portion at a fixed location thereon opposite said first internal wall of said slot, said clamping screw being selectively threadably movable into and out of abutting engagement with said tongue portion in order to clampingly urge said tongue against said first internal wall portion of said slot and to release said tongue portion for slidable movement within said slot, respectively.

18. A compound miter saw having a base, a saw blade and a blade guard selectively movable to any of a number of selected cutting positions, including miter, bevel, and compound cutting positions wherein the saw blade and the blade guard are further movable relative to a workpiece into and out of cutting engagement with the workpiece, and a workpiece-supporting fence assembly, wherein said fence assembly includes a fixed fence portion on one side of the saw blade, and a movable fence portion on the other side of the saw blade, said movable fence portion being selectively and adjustably movable toward and away from said fixed fence portion in order to allow clearance between said fixed and movable fence portions for cutting the workpiece when the saw blade and the blade guard are in any of said miter, bevel, and compound cutting positions, said movable fence portion having a raised portion thereof configured for interferingly engaging the blade guard if the saw blade and the blade guard are moved toward cutting engagement with the workpiece without said movable fence portion first being adjustably moved to a position relative to said fixed fence portion so as to allow sufficient clearance between said fixed and movable fence portions for cutting the workpiece when the saw blade is in any of a number of said miter, bevel, and compound cutting positions, thereby minimizing the possibility of cutting said movable fence portion, said fence assembly further including a fixed clamping means for selectively and clampingly securing said movable fence portion in cooperation with any of said number of selected cutting positions relative to the saw blade and the base, said fixed clamping means being fixedly interconnected with the base, and a movable clamping means fixedly interconnected with said movable fence portion for selective movement therewith relative to the base for selectively and clampingly securing said movable fence portion in cooperation with any of said number of selected cutting positions, said fence assembly thereby being selectively adjustable to vary the lateral spacing between said fixed and movable fence portions in order to provide clearance for the saw blade at any of said number of selected cutting positions.

19. A device adapted for performing working operations on a workpiece, the device having a base and a working tool selectively movable into any of a number of different preselected configurations, comprising: an adjustable, laterally-extending, workpiece-supporting fence assembly, said fence assembly including a fixed fence portion fixedly interconnected with the base and disposed on one side of the working tool, and a movable fence portion selectively laterally movable and interconnected with the base and disposed on an opposite side of the working tool laterally spaced from said fixed fence portion, said fence assembly further including a fixed clamping means for selectively and clampingly securing said movable fence portion at any of a number of selected positions relative to the saw blade and the base, said fixed clamping means being fixedly interconnected with the base, and a movable clamping means fixedly interconnected with said movable fence portion for selective movement therewith relative to the base for selectively and clampingly securing said movable fence portion at any of said selected positions, said fence assembly thereby being selectively adjustable to vary the lateral spacing between said fixed and movable fence portions in order to provide clearance for the working tool in any of the selected configurations thereof.

20. A device according to claim 19, wherein said fixed clamping means includes a clamping screw threadably engaging a portion of the base at a fixed location thereon, said clamping screw being selectively threadably movable into and out of abutting engagement with said movable fence portion in order to respectively secure and release said movable fence portion at selectively adjustable lateral positions relative to said fixed fence portion.

21. A device according to claim 19, wherein each of said fixed and movable fence portions has a raised portion protruding therefrom in a direction away from the base in order to engage and support a relatively large workpiece.

22. A device according to claim 19, wherein the working tool has a guard thereon, said working tool and said guard being movable between a working position engageable with the workpiece and a clear position away from the workpiece when the workpiece is held against said fence assembly, said movable fence portion having a raised portion protruding therefrom in a direction away from said frame, said raised portion being interferingly engageable with the guard if the working tool and the guard are moved toward said working position without said movable fence portion first being adjustably moved to a position relative to said fixed fence portion so as to allow sufficient clearance between the fixed and movable fence positions for performing an operation on the workpiece when the working tool is in any of a number of said preselected configurations, thereby minimizing the possibility of cutting the movable fence portion.

23. A device according to claim 19, further including antiremoval means for minimizing the possibility of inadvertent removal of said movable fence portion from said device during said lateral adjustable movement thereof, and removal means for overriding said antiremoval means in order to allow intentional removal of said movable fence portion.

24. A device according to claim 23, wherein said antiremoval means includes an elongated groove formed in said movable fence portion, and a projection interconnected with the base and protruding into said groove, the lateral length of said groove being insufficient to allow removal of said movable fence portion even when in a fully outward adjustable lateral position the maximum distance from said fixed fence portion.

25. A device according to claim 24, wherein said movable clamping means is configured for further preventing inadvertent removal of said movable fence portion unless said movable clamping means is first loosened from said movable fence portion.

26. A device adapted for performing working operations on a workpiece, the device having a base and a working tool selectively movable into a number of different preselected configurations, comprising: an adjustable, laterally-extending, workpiece-supporting fence assembly, said fence assembly including a fixed fence portion fixedly interconnected with the base and disposed on one side of the working tool, and a movable fence portion selectively laterally movable and interconnected with the base and disposed on an opposite side of the working tool laterally spaced from said fixed fence portion, said fence assembly further including a fixed clamping means fixedly interconnected with said base for selectively and clampingly securing said movable fence portion at any of a number of selected positions relative to the saw blade and the base, and a movable clamping means fixedly interconnected with said movable fence portion for selective movement therewith for selectively and clampingly securing said movable fence portion at any of said selected positions, said fence assembly thereby being selectively adjustable to vary the lateral spacing between said fixed and movable fence portions in order to provide clearance for the working tool in any of the selected configurations thereof, said movable clamping means including a clamping plate pivotally interconnected with said movable fence portion, said clamping plate having an abutment portion selectively movable into and out of clamping engagement with the base in order to respectively secure and release said movable fence at selectively adjustable lateral positions relative to said fixed fence portion.

27. A device according to claim 26, wherein said movable fence portion includes a shoulder portion having a fulcrum edge formed thereon, said clamping plate being pivotally movable about said fulcrum edge.

28. A device according to claim 27, wherein said movable clamping means includes selectively actuable means for releasably and forcibly urging a locking portion of said clamping plate toward said movable fence portion, said clamping plate pivotally engaging said fulcrum edge at a location between said abutment portion and said locking portion in order to pivot said abutment portion into said engagement with the base when said locking portion is forcibly urged toward said movable fence portion.

29. A device according to claim 28, wherein said selectively actuable means includes a threaded rod fixedly interconnected with said movable fence portion on one side of said clamping plate and extending through an opening in said clamping plate locking portion, and a threaded nut threadably engaging said threaded rod on an opposite side of said clamping plate for selectively and threadably urging said locking portion of said clamping plate toward said movable fence portion in order to cause said abutment portion to be pivotally urged into said clamping engagement with said opposite internal wall portion of said slot.

30. A device adapted for performing working operations on a workpiece, the device having a base and a working tool selectively movable into a number of different preselected configurations, comprising: an adjustable, laterally-extending, workpiece-supporting fence assembly, said fence assembly including a fixed fence portion fixedly interconnected with the base and disposed on one side of the working tool, and a movable fence portion selectively laterally movable and interconnected with the base and disposed on an opposite side of the working tool laterally spaced from said fixed fence portion, said fence assembly further including a fixed clamping means fixedly interconnected with said base for selectively and clampingly securing said movable fence portion at any of a number of selected positions relative to the working tool and the base, and a movable clamping means fixedly interconnected with said movable fence portion for selective movement therewith for selectively and clampingly securing said movable fence portion at any of said selected positions, said fence assembly thereby being selectively adjustable to vary the lateral spacing between said fixed and movable fence portions in order to provide clearance for the working tool in any of the preselected configurations thereof, the base including a fence-supporting portion fixedly disposed on said opposite side of the working tool with a laterally-extending slot formed therein, said slot having opposite internal walls therein, said movable fence portion having laterally-extending tongue portion slidably received within said slot for selective lateral movement therein toward and away from said fixed fence portion, said fixed clamping means being interconnected with said fence-supporting base portion for selectively and clampingly urging said tongue portion against a first portion of a first internal wall of said slot corresponding to any of a number of selected positions of said movable fence portion relative to the base, said movable clamping means being adapted for selectively and clampingly urging said tongue portion against a second portion of said first internal wall corresponding to said number of selected positions of said movable fence portion relative to the base.

31. A device according to claim 30, wherein said movable clamping means includes a clamping plate pivotally interconnected with said movable fence portion and having an abutment portion selectively pivotally movable into and out of clamping engagement with an opposite internal wall portion of said slot, said selective pivotal movement of said clamping plate abutment portion into clamping engagement with said opposite internal wall portion of said slot causing a reactive force clampingly urging said tongue portion against said first internal wall portion of said slot in order to adjustably secure said movable fence portion at selectively adjustable lateral positions relative to said fixed fence portion, and said selective pivotal movement of said clamping plate abutment portion out of clamping engagement with said opposite internal wall portion of said slot allowing said movable fence portion to be selectively and adjustably moved laterally toward and away from said fixed fence portion.

32. A device according to claim 31, wherein said movable fence portion includes a shoulder portion having a fulcrum edge formed thereon, said clamping plate being pivotally movable about said fulcrum edge.

33. A device according to claim 32, wherein said movable clamping means includes selectively actuable means for releasably and forcibly urging a locking portion of said clamping plate toward said movable fence portion, said clamping plate pivotally engaging said fulcrum edge at a location between said abutment portion and said locking portion in order to pivot said abutment portion into said engagement with said opposite internal wall portion of said slot when said locking portion is forcibly urged toward said movable fence portion.

34. A device according to claim 33, wherein said selectively actuable means includes a threaded rod fixedly interconnected with said movable fence portion on one side of said clamping plate and extending through an opening in said clamping plate locking portion, and a threaded nut threadably engaging said threaded rod on an opposite side of said clamping plate for selectively and threadably urging said locking portion of said clamping plate toward said movable fence portion in order to cause said abutment portion to be pivotally urged into said clamping engagement with said opposite internal wall portion of said slot.

35. A device according to claim 30, wherein said fixed clamping means includes a clamping screw threadably engaging a portion of said fence-supporting base portion at a fixed location thereon opposite said first internal wall of said slot, said clamping screw being selectively threadably movable into and out of abutting engagement with said tongue portion in order to clampingly urge said tongue against said first internal wall portion of said slot and to release said tongue portion for slidable movement within said slot, respectively.

36. A device adapted for performing working operations on a workpiece, the device having a frame, a working tool and a guard thereon capable of any of a number of different preselected configurations wherein the working tool and the guard are further movable relative to a workpiece into and out of engagement with the workpiece, and a workpiece-supporting fence assembly, wherein said fence assembly includes a fixed fence portion on one side of the working tool, and a movable fence portion on the other side of the working tool, said movable fence portion being selectively and adjustably movable toward and away from said fixed fence portion in order to allow clearance between said fixed and movable fence portions for performing an operation on the workpiece when the working tool and the guard are in any of said preselected configurations, said movable fence portion having a raised portion thereof configured for interferingly engaging the guard if the working tool and the guard are moved toward working engagement with the workpiece without said movable fence portion first being adjustably moved to a position relative to said fixed fence portion so as to allow sufficient clearance between said fixed and movable fence portions for performing an operation on the workpiece when the working tool is in any of a number of said preselected configurations, said fence assembly further including a fixed clamping means for selectively and clampingly securing said movable fence portion in cooperation with any of said number of preselected configurations, said fixed clamping means being fixedly interconnected with the frame, and a movable clamping means fixedly interconnected with said movable fence portion for selective movement therewith relative to the frame for selectively and clampingly securing said movable fence portion in cooperation with any of said number of preselected configurations, said fence assembly thereby being selectively adjustable to vary the lateral spacing between said fixed and movable fence portions in order to provide clearance for the working tool at any of said number of preselected configurations.

37. A device adapted for performing working operations on a workpiece, the device having a base and working tool selectively movable into a number of different preselected configurations, the improvement comprising: an adjustable, laterally-extending, workpiece-supporting fence assembly, said fence assembly including a first movable fence portion selectively laterally movable toward and away from the working tool and interconnected with the base on one lateral side of the working tool, and a second movable fence portion selectively laterally movable toward and away from the working tool and interconnected with the base on an opposite lateral side of the working tool, said fence assembly further including fixed clamping means for selectively and clampingly securing each of said movable fence portions respectively and independently at any of a number of respective selected positions relative to the working tool and the base, said fixed clamping means being fixedly interconnected with the base, and movable clamping means fixedly interconnected with each of said movable fence portions for selective respective movement therewith relative to the base for selectively and clampingly securing each of said movable fence portions respectively and independently at any of said respective selected positions, said fence assembly thereby being selectively adjustable to vary the lateral spacing between said first and second movable fence portions in order to provide clearance for the working tool at any of the preselected configurations on either lateral side of the device.

38. A device according to claim 37, wherein said movable clamping means includes a clamping plate pivotally interconnected with each of said movable fence portions, each of said clamping plates having an abutment portion selectively movable into and out of clamping engagement with the base in order to respectively secure and release said movable fence portions at respective selectively adjustable lateral positions relative to the working tool and the base.

39. A device according to claim 38, wherein each of said movable fence portions includes a shoulder portion having a fulcrum edge formed thereon, said clamping plates being independently and pivotally movable about said respective fulcrum edges.

40. A device according to claim 39, wherein said movable clamping means includes selectively actuable means for releasably and forcibly urging a locking portion of each of said clamping plates toward said respective movable fence portions, each of said clamping plates pivotally engaging said respective fulcrum edges at locations between said respective abutment portions and locking portions in order to independently pivot said respective abutment portions into said engagement with the base when said respective locking portions are forcibly urged toward said respective movable fence portions.

41. A device according to claim 40, wherein each of said selectively actuable means includes a threaded rod fixedly interconnected with said respective movable fence portions on one side of said respective clamping plates and extending through an opening in said respective clamping plate locking portions, and a threaded nut threadably engaging each of said threaded rods on an opposite side of said respective clamping plates for selectively and threadably urging said locking portions of said respective clamping plates toward said respective movable fence portions in order to cause said respective abutment portions to be pivotally urged into said clamping engagement with the base.

42. A device according to claim 41, wherein said fence assembly includes a fence-supporting base portion on each lateral side of the working tool for supporting said respective movable fence portions during said selective lateral movement, each of said fixed clamping means including a clamping screw threadably engaging a portion of said respective fence-supporting base portions at a fixed location thereon, said clamping screws being selectively threadably movable into and out of abutting engagement with said respective movable fence portions in order to clampingly secure and release said respective movable fence portions for slidable movement relative to said respective fence-supporting base portions.

43. A device according to claim 42, wherein each of said movable fence portions has a raised portion protruding therefrom in a direction away from the base in order to engage and support a relatively large workpiece.

44. A device according to claim 43, wherein the device is a compound miter saw, and the working tool is a saw blade selectively movable into a number of miter, bevel, and compound cutting positions on either lateral side of the device.

45. A device according to claim 37, wherein the device is a compound miter saw, and the working tool is a saw blade selectively movable into a number of miter, bevel, and compound cutting positions on either lateral side of the device.

46. A compound miter saw having a base and a saw blade selectively movable to any of a number of selected cutting positions, including miter, bevel, and compound cutting positions, comprising: an adjustable, laterally-extending, workpiece-supporting fence assembly, said fence assembly including a fixed fence portion fixedly interconnected with the base and disposed on one side of the saw blade, and a movable fence portion selectively laterally movable and interconnected with the base and disposed on an opposite side of the saw blade laterally spaced from said fixed fence portion, said fence assembly further including a fixed clamp for selectively and clampingly securing said movable fence portion in cooperation with any of said number of selected cutting positions relative to the saw blade and the base, said fixed clamp being fixedly interconnected with the base, and a movable clamp fixedly interconnected with said movable fence portion for selective movement therewith relative to the base for selectively and clampingly securing said movable fence portion in cooperation with any of said number of selected cutting positions, said fence assembly thereby being selectively adjustable to vary the lateral spacing between said fixed and movable fence portions in order to provide clearance for the saw blade at any of said number of selected cutting positions.

47. A device adapted for performing working operations on a workpiece, the device having a frame and a working tool selectively movable into a number of different preselected configurations, comprising: an adjustable, laterally-extending, workpiece-supporting fence assembly, said fence assembly including a fixed fence portion fixedly interconnected with the frame and disposed on one side of the working tool, and a movable fence portion selectively laterally movable and interconnected with the frame and disposed on an opposite side of the working tool laterally spaced from said fixed fence portion, said fence assembly further including a fixed clamp for selectively and clampingly securing said movable fence portion at any of a number of selected positions relative to the saw blade and the frame, said fixed clamp being fixedly interconnected with the frame, and a movable clamp fixedly interconnected with said movable fence portion for selective movement therewith relative to the frame for selectively and clampingly securing said movable fence portion at any of said selected positions, said fence assembly thereby being selectively adjustable to vary the lateral spacing between said fixed and movable fence portions in order to provide clearance for the working tool in any of the preselected configurations thereof.

* * * * *